US012695219B2

(12) United States Patent
Miyamura et al.

(10) Patent No.: US 12,695,219 B2
(45) Date of Patent: Jul. 28, 2026

(54) COMBINATION TERMINAL WITH FIRST TERMINAL LOCKED TO SECOND TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tetsuya Miyamura, Mie (JP); Hideto Nakamura, Mie (JP); Shinji Nozaki, Mie (JP); Daisuke Saito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 308 days.

(21) Appl. No.: 18/565,990

(22) PCT Filed: May 27, 2022

(86) PCT No.: PCT/JP2022/021717
§ 371 (c)(1),
(2) Date: Nov. 30, 2023

(87) PCT Pub. No.: WO2022/264779
PCT Pub. Date: Dec. 22, 2022

(65) Prior Publication Data
US 2024/0243493 A1 Jul. 18, 2024

(30) Foreign Application Priority Data
Jun. 15, 2021 (JP) ................................ 2021-099235

(51) Int. Cl.
*H01R 11/09* (2006.01)
*H01R 13/11* (2006.01)
(Continued)

(52) U.S. Cl.
CPC .......... *H01R 11/09* (2013.01); *H01R 13/113* (2013.01); *H01R 43/16* (2013.01); *H01R 4/185* (2013.01);
(Continued)

(58) Field of Classification Search
CPC ...... H01R 11/09; H01R 13/113; H01R 43/16; H01R 4/185; H01R 11/00; H01R 11/03;
(Continued)

(56) References Cited

U.S. PATENT DOCUMENTS 5,558,531 A * 9/1996 Ikeda .................... H01R 13/28 439/907
5,834,696 A 11/1998 Kurosawa et al.
2001/0025719 A1 10/2001 Kondo

FOREIGN PATENT DOCUMENTS

JP H11-067305 A 3/1999
JP 2006-012608 A 1/2006
(Continued)

OTHER PUBLICATIONS

International Search Report issued on Jul. 12, 2022 for WO 2022/264779 A1 (4 pages).

*Primary Examiner* — Justin M Kratt
(74) *Attorney, Agent, or Firm* — Venjuris, P.C.

(57) ABSTRACT

It is aimed to enable manual assembly. A combination terminal is provided with a first terminal fitting including a first base plate portion and a second terminal fitting including a second base plate portion to be stacked on the first base plate portion, the second terminal fitting being assembled with the first terminal fitting by being displaced in a direc-
(Continued)

tion intersecting a stacking direction. The first terminal fitting is formed with a resiliently deformable first resilient lock piece. The second terminal fitting is formed with a second lock portion for locking the first and second terminal fittings in an assembled state by being locked to the first resilient lock piece. The first terminal fitting is integrally formed with a first protecting portion for preventing interference of an external matter with the first resilient lock piece.

10 Claims, 7 Drawing Sheets

(51) Int. Cl.
*H01R 43/16* (2006.01)
*H01R 4/18* (2006.01)
*H01R 11/00* (2006.01)
*H01R 11/03* (2006.01)
*H01R 11/12* (2006.01)
*H01R 13/02* (2006.01)

(52) U.S. Cl.
CPC .............. *H01R 11/00* (2013.01); *H01R 11/03* (2013.01); *H01R 11/12* (2013.01); *H01R 13/02* (2013.01); *H01R 13/11* (2013.01); *H01R 13/114* (2013.01)

(58) Field of Classification Search
CPC ........ H01R 11/12; H01R 13/02; H01R 13/11; H01R 13/114
See application file for complete search history.

(56) References Cited

FOREIGN PATENT DOCUMENTS

| | | | |
|---|---|---|---|
| JP | 2011-222317 | A | 11/2011 |
| JP | 2022-079222 | A | 5/2022 |

* cited by examiner

COMBINATION TERMINAL WITH FIRST TERMINAL LOCKED TO SECOND TERMINAL

CROSS REFERENCE TO RELATED APPLICATIONS

This application is a national phase of PCT application No. PCT/JP2022/021717, filed on 27 May 2022, which claims priority from Japanese patent application No. 2021-099235, filed on 15 Jun. 2021, all of which are incorporated herein by reference.

TECHNICAL FIELD

The present disclosure relates to a combination terminal.

BACKGROUND

Patent Document 1 discloses a structure for assembling a first terminal body and a second terminal body. Each terminal body is shaped by connecting a pair of plate-like overlapping portions via a stepped coupling portion. The two terminal bodies are assembled by alternately overlapping the plate-like overlapping portions and the coupling portions. The two terminal bodies are locked in an assembled state by fitting lock protrusions formed on the plate-like overlapping portions of one terminal body into lock holes formed in the plate-like overlapping portions of the other terminal body.

PRIOR ART DOCUMENT

Patent Document

Patent Document 1: JP H11-067305 A

SUMMARY OF THE INVENTION

Problems to be Solved

In the process of assembling the terminal bodies, the lock protrusions are rubbed while being strongly pressed against the mating plate-like overlapping portions, whereby a large sliding resistance is generated. Thus, it is difficult to manually assemble the terminal bodies.

A combination terminal of the present disclosure was completed on the basis of the above situation and aims to enable manual assembly.

Means to Solve the Problem

The present disclosure is directed to a combination terminal with a first terminal fitting including a first base plate portion and a second terminal fitting including a second base plate portion to be stacked on the first base plate portion, the second terminal fitting being assembled with the first terminal fitting by being displaced in a direction intersecting a stacking direction, the first terminal fitting being formed with a resiliently deformable resilient lock piece, the second terminal fitting being formed with a lock portion for locking the first and second terminal fittings in an assembled state by being locked to the resilient lock piece, and the first terminal fitting being integrally formed with a protecting portion for preventing interference of an external matter with the resilient lock piece.

Effect of the Invention

According to the present disclosure, manual assembly is possible.

DETAILED DESCRIPTION TO EXECUTE THE INVENTION

Description of Embodiments of Present Disclosure

Figure 1:
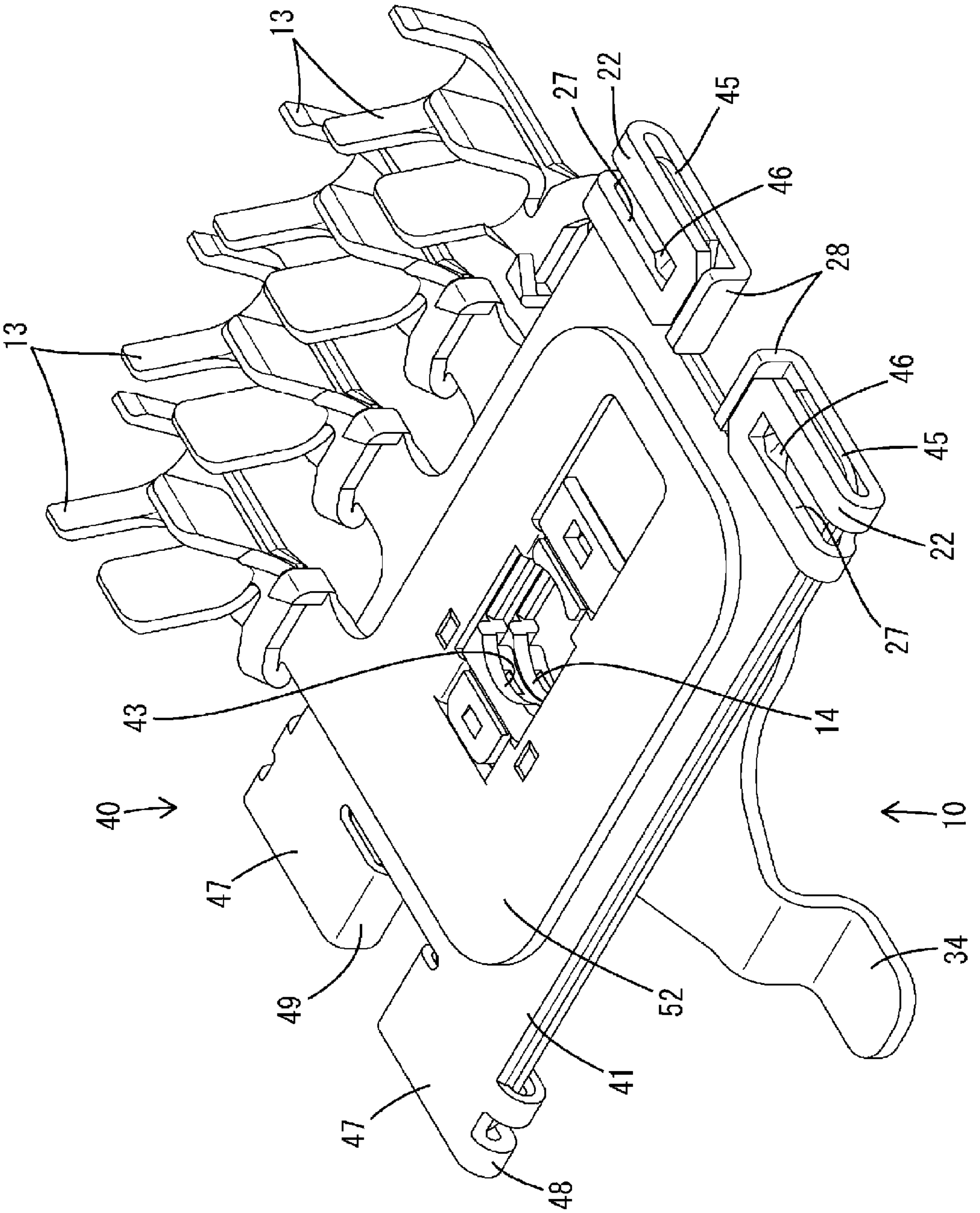
FIG. 1 is a perspective view showing an assembled state of a combination terminal.

First, embodiments of the present disclosure are listed and described.

(1) The combination terminal of the present disclosure is provided with a first terminal fitting including a first base plate portion and a second terminal fitting including a second base plate portion to be stacked on the first base plate portion, the second terminal fitting being assembled with the first terminal fitting by being displaced in a direction intersecting a stacking direction, the first terminal fitting being formed with a resiliently deformable resilient lock piece, the second terminal fitting being formed with a lock portion for locking the first and second terminal fittings in an assembled state by being locked to the resilient lock piece, and the first terminal fitting being integrally formed with a protecting portion for preventing interference of an external matter with the resilient lock piece. According to the configuration of the present disclosure, the resilient lock piece is resiliently deformed in the process of assembling the first and second terminal fittings. Since resistance generated in the assembly process of the both terminal fittings is small as compared to the case where a resiliently undeformable projection is strongly rubbed against a mating terminal fitting, manual assembly is possible. Since the interference of an external matter with the resilient lock piece is prevented by the protecting portion, the reliability of a locking function by the resilient lock piece and the lock portion is high.

(2) Preferably, the protecting portion has a guide surface to be brought into sliding contact with the second terminal fitting in the process of assembling the first and second terminal fittings. According to this configuration, workability at the time of assembling the both terminal fittings is good. The shape of the first terminal fitting can be simplified as compared to the case where a guide surface is formed on a part different from the protecting portion.

(3) Preferably, the resilient lock piece has a cantilever shape extending from the first base plate portion, and the lock portion is arranged to lock an extending end part of the resilient lock piece. According to this configuration, since a resilient deformation amount of the resilient lock piece when the extending end part of the resilient lock piece is locked by the lock portion is smaller than that when a base end part connected to the first base plate portion, out of the resilient lock piece, is locked by the lock portion, assembly resistance due to the resilient deformation of the resilient lock piece is reduced accordingly.

(4) Preferably, the resilient lock piece is arranged to sandwich the second base plate portion between the first base plate portion and the resilient lock piece. According to this configuration, the resilient lock piece also has a function of preventing the separation of the first and second terminal fittings. The shape of the first terminal fitting can be simplified as compared to the case where a dedicated part for preventing the separation of the first and second terminal fittings is formed separately from the resilient lock piece.

(5) Preferably in (4), the resilient lock piece includes a bent portion folded and extending from the first base plate portion and a folded portion cantilevered parallel to the first base plate portion from the bent portion, and the second base plate portion is arranged to overlap on a base end part connected to the bent portion, out of the folded portion. A displacement amount of the base end part of the folded portion is smaller than that of the extending end part of the folded portion when the resilient lock piece is resiliently deformed. The separation of the first and second terminal fittings can be reliably prevented by overlapping the base end part of the folded portion on the second base plate portion.

(6) Preferably, the resilient lock piece includes a bent portion folded and extending from the first base plate portion and a folded portion cantilevered parallel to the first base plate portion from the bent portion, and the protecting portion is arranged side by side with an extending end part of the folded portion. The extending end part of the folded portion is a most easily displaceable part of the resilient lock piece during interference with an external matter. Since the protecting portion is arranged side by side with the extending end part of the folded portion, an effect of suppressing the deformation of the resilient lock piece is high.

(7) Preferably, the protecting portion is in the form of a rib arranged on a rear end part of the first terminal fitting in an assembly direction with the second terminal fitting and extending in parallel to the assembly direction. According to this configuration, a finger can be placed on the protecting portion to push the first terminal fitting when the first and second terminal fittings are assembled. Since the protecting portion is in the form of a rib parallel to the assembly direction of the first and second terminal fittings, there is no possibility that the protecting portion is deformed even if being pushed with a finger during assembly.

Preferably, the resilient lock piece includes a bent portion folded and extending from the first base plate portion and a folded portion cantilevered parallel to the first base plate portion from the bent portion, and at least the bent portion of the resilient lock piece is formed with a slit along an extending direction of the resilient lock piece. According to this configuration, since a cross-sectional area of the bent portion is reduced by forming the slit in the resilient lock piece, processability is good when the resilient lock piece is formed by bending.

Details of Embodiment of Present Disclosure

Embodiment 1

Figure 3:
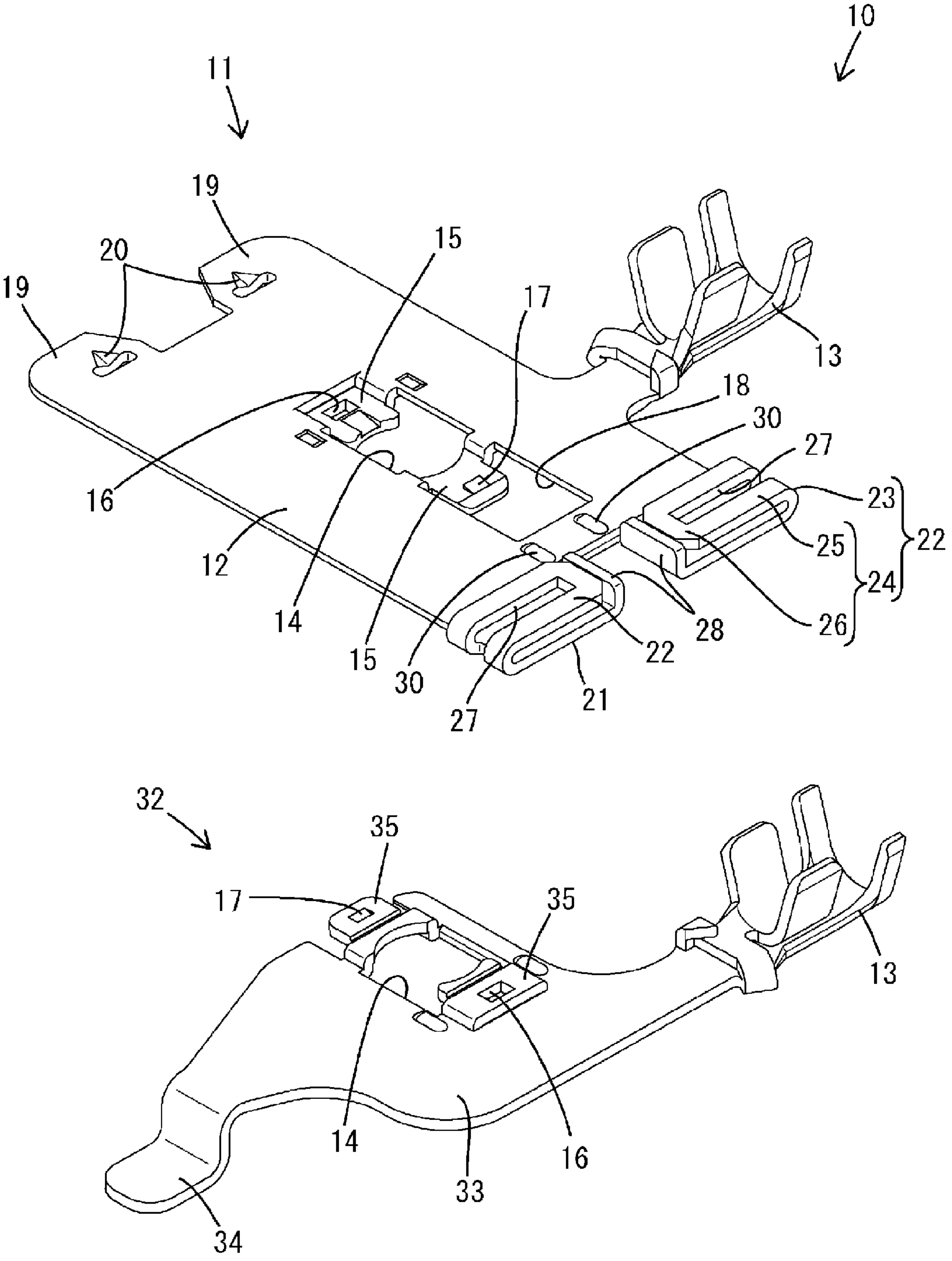
FIG. 3 is a perspective view showing a separated state of a first terminal fitting and a first sub-terminal.
Figure 4:
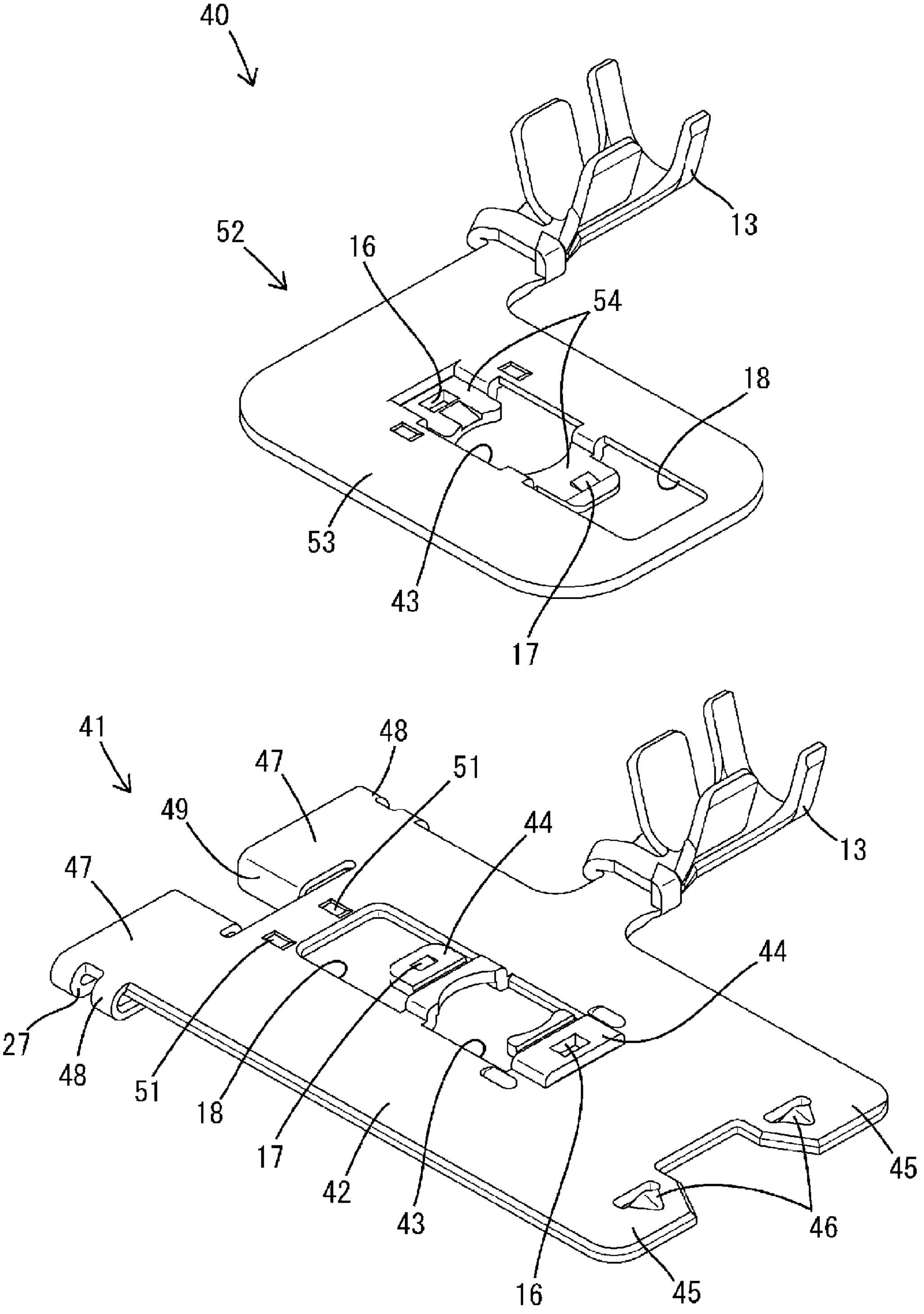
FIG. 4 is a perspective view showing a separated state of a second terminal fitting and a second sub-terminal.
Figure 5:
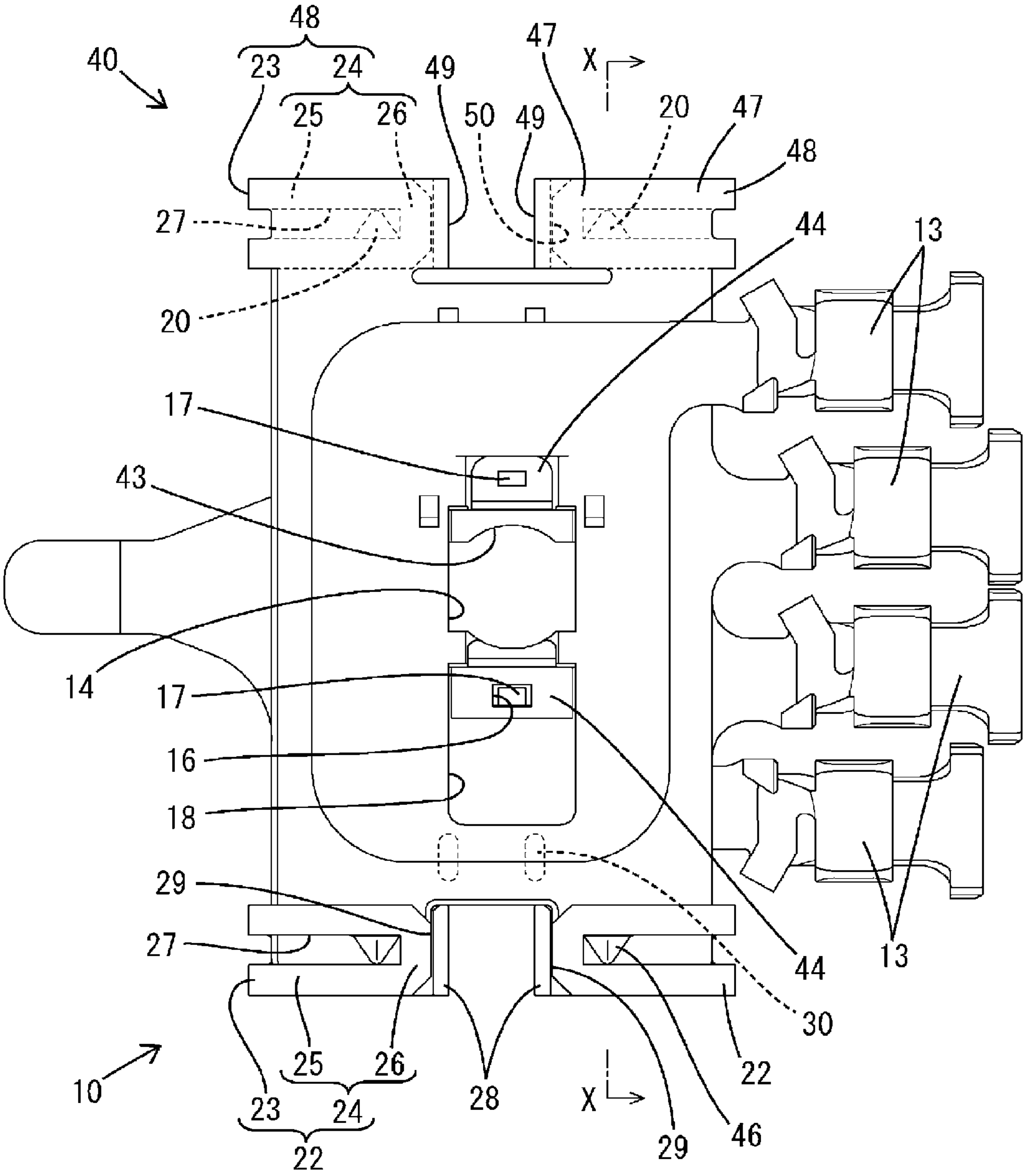
FIG. 5 is a plan view showing an assembled state of the first and second terminal modules.
Figure 6:
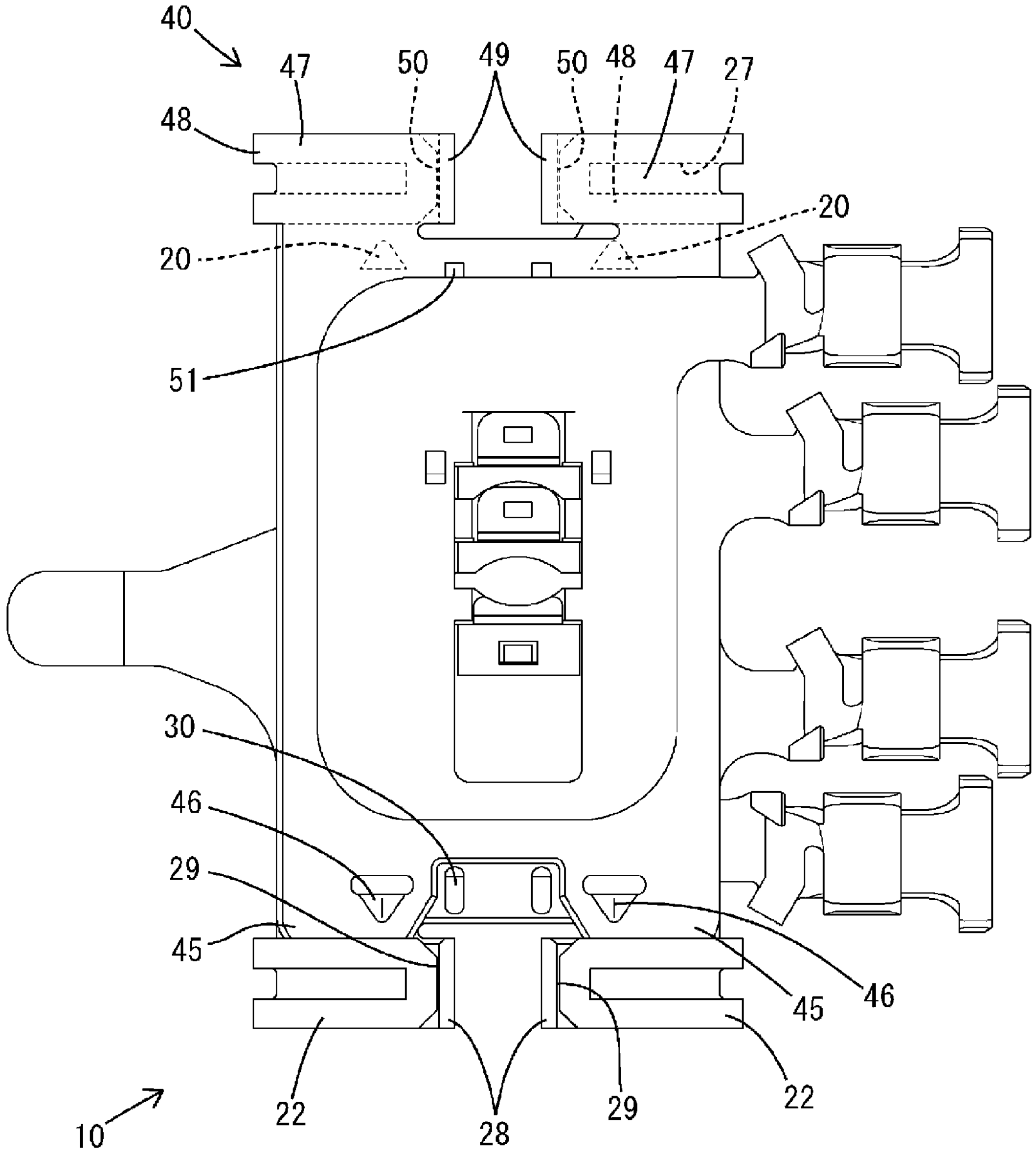
FIG. 6 is a plan view showing a state when the assembly of the first and second terminal modules is started.
Figure 7:
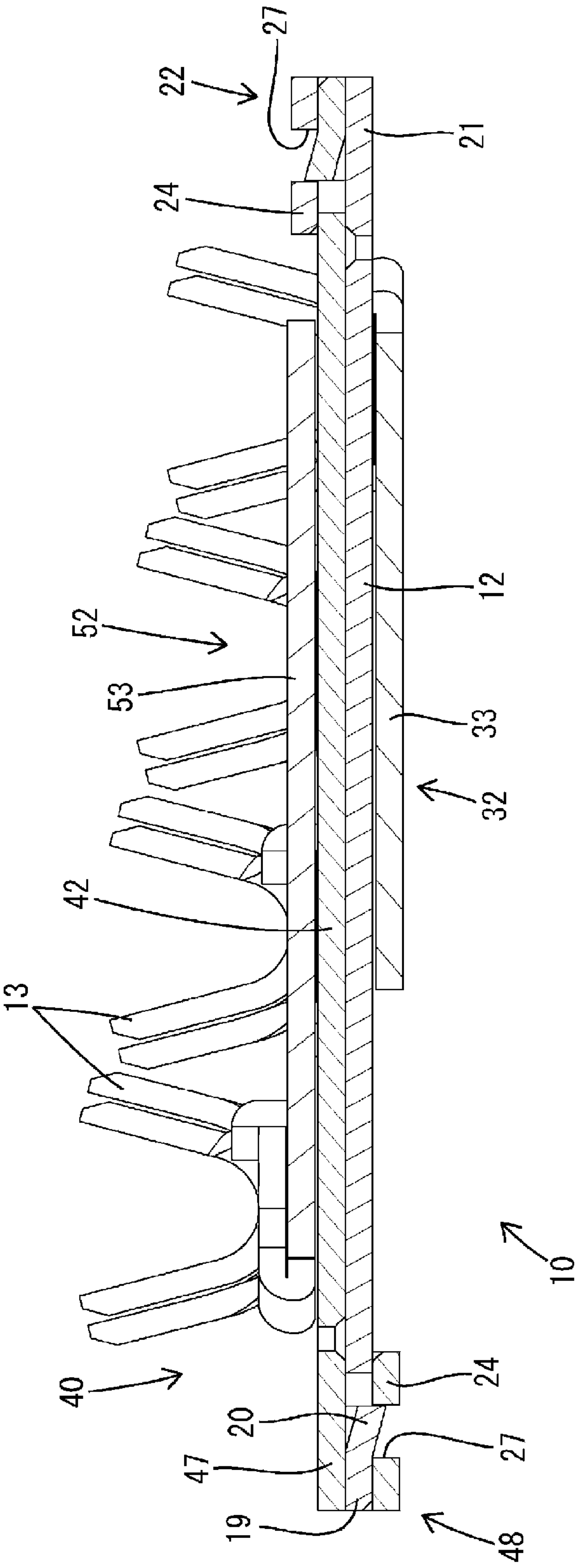
FIG. 7 is a section along X-X of FIG. 5.

One specific embodiment of the present disclosure is described below with reference to FIGS. 1 to 7. Note that the present invention is not limited to these illustrations, but is represented by claims and intended to include all changes in the scope of claims and in the meaning and scope of equivalents. In this embodiment, an oblique left lower side in FIGS. 1 to 4 and a left side in FIGS. 5 and 6 are defined as a front side concerning a front-rear direction. Upper and lower sides shown in FIGS. 1 to 4 and 7 are directly defined as upper and lower sides concerning a vertical direction. An oblique left upper side in FIGS. 1 to 4 and an upper side in FIGS. 5 and 6 are defined as a right side concerning a lateral direction.

Figure 2:
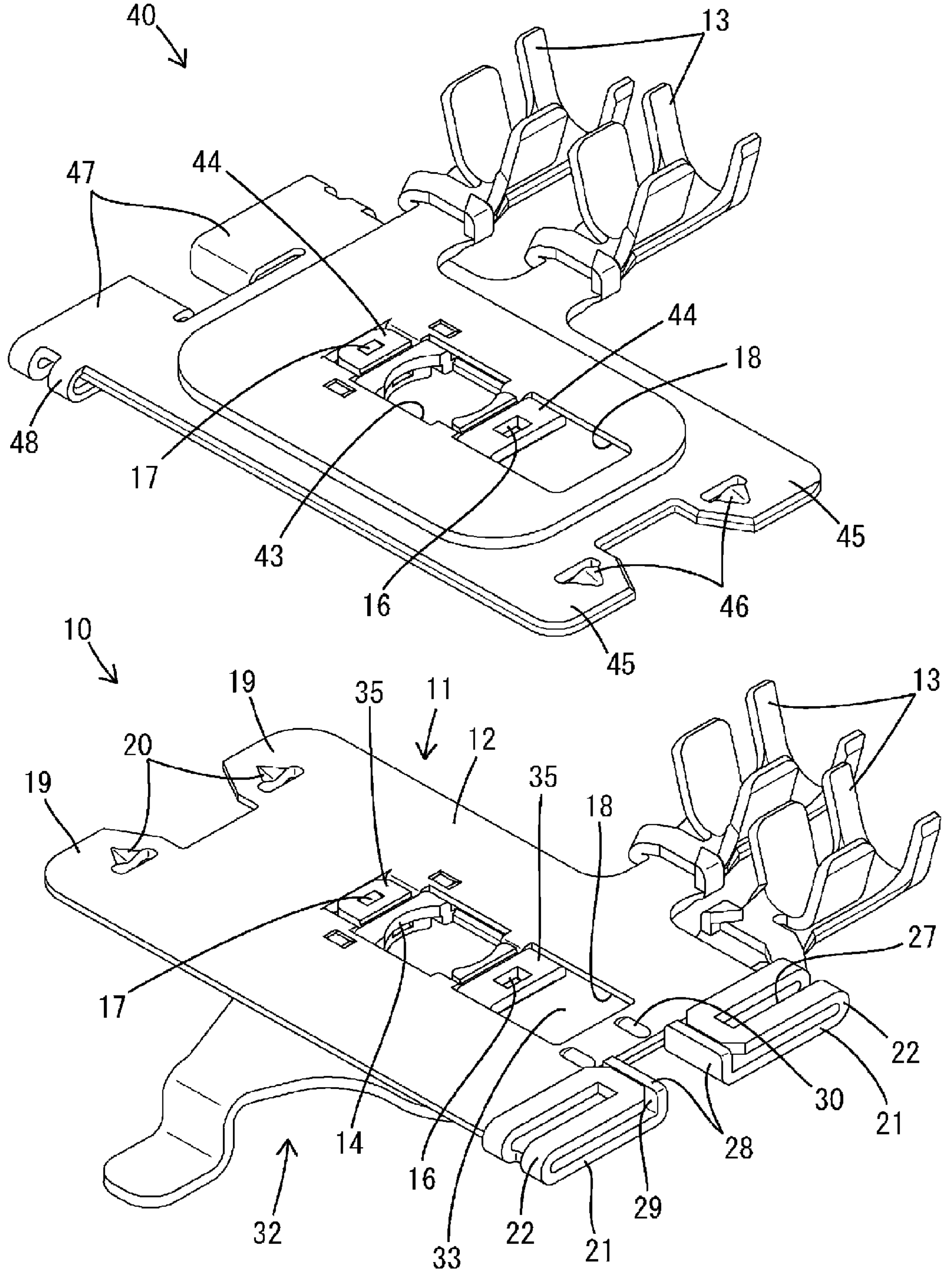
FIG. 2 is a perspective view showing a separated state of a first terminal module and a second terminal module.

A combination terminal of this embodiment is configured by assembling a first terminal module 10 and a second terminal module 40 as shown in FIGS. 1 and 2. As shown in FIG. 3, the first terminal module 10 is configured by assembling a first terminal fitting 11 and a first sub-terminal 32. As shown in FIG. 4, the second terminal module 40 is configured by assembling a second terminal fitting 41 and a second sub-terminal 52.

(First Terminal Module 10)

The first terminal fitting 11 is a single component formed, such as by bending a metal plate material having a predetermined shape. As shown in FIG. 3, the first terminal fitting 11 includes one first base plate portion 12 having a plate thickness direction oriented in the vertical direction and a crimping portion 13 in the form of an open barrel extending rearward from the rear end edge of the first base plate portion 12. A first bolt hole 14 penetrating through the first base plate portion 12 in the plate thickness direction is formed in a central part of the first base plate portion 12.

A pair of left and right first receiving portions 15 are formed on a hole edge part of the first bolt hole 14. The first receiving portions 15 are arranged at positions lower than the first base plate portion 12 via steps by a plate thickness of the first base plate portion 12. The right first receiving portion 15 is formed with a retaining hole 16, and the left first receiving portion 15 is formed with a retaining projection 17. A cut portion 18 is formed at a position of the first base plate portion 12 on a side opposite to the first bolt hole 14 across the left first receiving portion 15.

The first base plate portion 12 is formed with a pair of first lock fitting portions 19 spaced apart in the front-rear direction. The pair of first lock fitting portions 19 are flat plate-like parts projecting rightward from the right end edge of the first base plate portion 12 in flush with the first base plate portion 12. Each first lock fitting portion 19 is formed with a first lock portion 20 by striking a part of the first lock fitting portion 19 toward a lower surface side to have a triangular shape.

The first base plate portion 12 is formed with a pair of first lock supporting portions 21 spaced apart in the front-rear direction. The pair of first lock supporting portions 21 are flat plate-like parts projecting leftward from the left end edge of the first base plate portion 12 in flush with the first base plate portion 12. Each first lock supporting portion 21 is integrally formed with a first resilient lock piece 22 and a first protecting portion 28.

The first resilient lock piece 22 formed in the front first lock supporting portion 21 has a cantilever shape extending from the front end edge of the first lock supporting portion 21. The first resilient lock piece 22 includes a bent portion 23 and a folded portion 24. The bent portion 23 is a part bent into a semicircular shape toward an upper surface side of the first lock supporting portion 21 from the front end edge of the first lock supporting portion 21. The folded portion 24 is a flat plate-like part cantilevered rearward in parallel to the first lock supporting portion 21 from the upper end edge of the bent portion 23. A base end part 25 of the folded portion 24 is connected to the bent portion 23, and an extending end part 26 of the folded portion 24 is located on a rear end part of the first resilient lock piece 22.

The first resilient lock piece 22 is formed with one slit 27 along an extending direction from the first lock supporting portion 21. A formation range of the slit 27 in the extending direction is the entire bent portion 23 and a region of the folded portion 24 except the extending end part 26. The first resilient lock piece 22 can be resiliently displaced in a direction separating from the upper surface of the first lock supporting portion 21, i.e. upward, with the bent portion 23 as a fulcrum while resiliently deforming the bent portion 23 and the folded portion 24.

The first protecting portion 28 formed on the front first lock supporting portion 21 projects toward the upper surface side of the first lock supporting portion 21 from the rear end edge of the first lock supporting portion 21. The first protecting portion 28 is in the form of a rib linearly extending in the lateral direction. The first protecting portion 28 is arranged side by side with the rear end edge of the first resilient lock piece 22 in the front-rear direction, i.e. the extending end part 26, while hardly forming a gap therebetween. The upper end of the first protecting portion 28 is at the same height as the upper surface of the first resilient lock piece 22. The first protecting portion 28 is located to cover a gap between the upper surface of the first lock supporting portion 21 and the lower surface of the folded portion 24 from behind. The front surface of the first protecting portion 28 facing the first resilient lock piece 22 functions as a first guide surface 29 linearly extending in the lateral direction. The first guide surface 29 is parallel to an assembly direction of the both terminal fittings 11, 41.

The first resilient lock piece 22 formed on the rear first lock supporting portion 21 has a front-rear symmetrical shape with the first resilient lock piece 22 of the front first lock supporting portion 21. The first protecting portion 28 formed on the rear first lock supporting portion 21 has a front-rear symmetrical shape with the first protecting portion 28 of the front first lock supporting portion 21. A pair of front and rear first contact point portions 30 are formed on a left end part of the first base plate portion 12. The pair of first contact point portions 30 are arranged to the right of and adjacent to the pair of first protecting portions 28, and project toward the upper surface side of the first base plate portion 12.

The first sub-terminal 32 is a single component formed, such as by bending a metal plate material having a predetermined shape. The first sub-terminal 32 includes one first plate-like base portion 33 having a plate thickness direction oriented in the vertical direction and a crimping portion 13 in the form of an open barrel extending rearward from the rear end edge of the first plate-like base portion 33. A stepped rotation stop portion 34 is formed on a front end part of the first plate-like base portion 33. The rotation stop portion 34 is locked to a body (not shown) of an automotive vehicle, which is an object on which the combination terminal of this embodiment is mounted. By locking the rotation stop portion 34 to the body, the combination terminal can be prevented from being rotated when the combination terminal is bolted to the body.

The first plate-like base portion 33 is formed with a first bolt hole 14 penetrating through the first plate-like base portion 33 in the plate thickness direction. A pair of left and right first covering portions 35 are formed on a hole edge part of the first bolt hole 14. The first covering portions 35 are arranged at positions higher than the first plate-like base portion 33 via steps by a plate thickness of the first plate-like base portion 33. The right first covering portion 35 is formed with a retaining projection 17, and the left first covering portion 35 is formed with a retaining hole 16.

With the first terminal fitting 11 and the first sub-terminal 32 assembled, the first base plate portion 12 is staked on the upper surface of the first plate-like base portion 33 and the first covering portions 35 are stacked on the upper surfaces of the first receiving portions 15 as shown in FIG. 2, whereby the first terminal fitting 11 and the first sub-terminal 32 are held not to be separated in the plate thickness direction. By locking the retaining hole 16 and the retaining projection 17 of the first receiving portions 15 to the retaining projection 17 and the retaining hole 16 of the first covering portions 35, the first terminal fitting 11 and the first sub-terminal 32 are held not to be separated in the lateral direction.

In an assembled state of the first terminal module 10, the first bolt hole 14 of the first terminal fitting 11 and the first bolt hole 14 of the first sub-terminal 32 are coaxially arranged and the crimping portion 13 of the first terminal fitting 11 and the crimping portion 13 of the first sub-terminal 32 are arranged laterally adjacent to each other. The first lock fitting portions 19 are arranged to project further rightward than the right end edge of the first plate-like base portion 33. The first lock supporting portions 21 and the first resilient lock pieces 22 are arranged to project further leftward than the left end edge of the first plate-like base portion 33.

(Second Terminal Module 40)

The second terminal fitting 41 is a single component formed, such as by bending a metal plate material having a predetermined shape. As shown in FIG. 4, the second terminal fitting 41 includes one second base plate portion 42 having a plate thickness direction oriented in the vertical direction and a crimping portion 13 in the form of an open barrel extending rearward from the rear end edge of the second base plate portion 42. A second bolt hole 43 penetrating through the second base plate portion 42 in the plate thickness direction is formed in a central part of the second base plate portion 42. A pair of left and right second covering portions 44 are formed on a hole edge part of the second bolt hole 43. The second covering portions 44 are arranged at positions higher than the second base plate portion 42 via steps by a plate thickness of the second base plate portion 42. The right second covering portion 44 is formed with a retaining projection 17, and the left second covering portion 44 is formed with a retaining hole 16. A cut portion 18 is formed at a position of the second base plate portion 42 on a side opposite to the second bolt hole 43 across the right second covering portion 44.

The second base plate portion 42 is formed with a pair of second lock fitting portions 45 spaced apart in the front-rear direction. The pair of second lock fitting portions 45 are flat plate-like parts projecting leftward from the left end edge of the second base plate portion 42 in flush with the second base plate portion 42. Each second lock fitting portion 45 is formed with a second lock portion 46 by striking a part of the second lock fitting portion 45 toward an upper surface side to have a triangular shape.

The second base plate portion 42 is formed with a pair of second lock supporting portions 47 spaced apart in the front-rear direction. The pair of second lock supporting portions 47 are flat plate-like parts projecting rightward from the right end edge of the second base plate portion 42 in flush with the second base plate portion 42. Each second lock supporting portion 47 is integrally formed with a second resilient lock piece 48 and a second protecting portion 49.

As shown in FIG. 5, the second resilient lock piece 48 formed in the front second lock supporting portion 47 has a cantilever shape extending from the front end edge of the second lock supporting portion 47. The second resilient lock piece 48 includes a bent portion 23 and a folded portion 24. The bent portion 23 is a part bent into a semicircular shape toward a lower surface side of the second lock supporting portion 47 from the front end edge of the second lock supporting portion 47. The folded portion 24 is a flat plate-like part cantilevered rearward in parallel to the second lock supporting portion 47 from the lower end edge of the bent portion 23. A base end part 25 of the folded portion 24 is connected to the bent portion 23, and an extending end part 26 of the folded portion 24 is located on a rear end part of the second resilient lock piece 48. The second resilient lock piece 48 is formed with one slit 27 along an extending direction from the second lock supporting portion 47. A formation range of the slit 27 in the extending direction of the second resilient lock piece 48 is the entire bent portion 23 and a region of the folded portion 24 except the extending end part 26. The second resilient lock piece 48 can be resiliently displaced in a direction separating from the lower surface of the second lock supporting portion 47 first lock supporting portion 21, i.e. downward, with the bent portion 23 as a fulcrum while resiliently deforming the bent portion 23 and the folded portion 24.

The second protecting portion 49 formed on the front second lock supporting portion 47 projects toward the lower surface side of the second lock supporting portion 47 from the rear end edge of the second lock supporting portion 47. The second protecting portion 49 is in the form of a rib linearly extending in the lateral direction. The second protecting portion 49 is arranged side by side with the rear end edge of the second resilient lock piece 48, i.e. the extending end part 26, in the front-rear direction while hardly forming a gap therebetween. The lower end of the second protecting portion 49 is at the same height as the lower surface of the second resilient lock piece 48. The second protecting portion 49 is located to cover a gap between the lower surface of the second lock supporting portion 47 and the upper surface of the folded portion 24 from behind. The front surface of the second protecting portion 49 facing the second resilient lock piece 48 functions as a second guide surface 50 linearly extending in the lateral direction. The second guide surface 50 is parallel to the assembly direction of the both terminal fittings 11, 41.

The second resilient lock piece 48 formed on the rear second lock supporting portion 47 has a front-rear symmetrical shape with the second resilient lock piece 48 of the front second lock supporting portion 47. The second protecting portion 49 formed on the rear second lock supporting portion 47 has a front-rear symmetrical shape with the second protecting portion 49 of the front second lock supporting portion 47. A pair of front and rear second contact point portions 51 are formed on a right end part of the second base plate portion 42. The pair of second contact point portions 51 are arranged to the left of and adjacent to the pair of second protecting portions 49, and project toward the lower surface side of the second base plate portion 42.

The second sub-terminal 52 is a single component formed, such as by bending a metal plate material having a predetermined shape. The second sub-terminal 52 includes one second plate-like base portion 53 having a plate thickness direction oriented in the vertical direction and a crimping portion 13 in the form of an open barrel extending rearward from the rear end edge of the second plate-like base portion 53. The second plate-like base portion 53 is formed with a second bolt hole 43 penetrating through the second plate-like base portion 53 in the plate thickness direction. A pair of left and right second receiving portions 54 are formed on a hole edge part of the second bolt hole 43. The second receiving portions 54 are arranged at positions lower than the second plate-like base portion 53 via steps by a plate thickness of the second plate-like base portion 53. The right second receiving portion 54 is formed with a retaining hole 16, and the left second receiving portion 54 is formed with a retaining projection 17.

With the second terminal fitting 41 and the second sub-terminal 52 assembled, the second plate-like base portion 53 is staked on the upper surface of the second base plate portion 42 and the second covering portions 44 are stacked on the upper surfaces of the second receiving portions 54 as shown in FIG. 2, whereby the second terminal fitting 41 and the second sub-terminal 52 are held not to be separated in the plate thickness direction. By locking the retaining projection 17 and the retaining hole 16 of the second receiving portions 44 to the retaining hole 16 and the retaining projection 17 of the second receiving portions 54, the second terminal fitting 41 and the second sub-terminal 52 are held not to be separated in the lateral direction.

In an assembled state of the second terminal module 40, the second bolt hole 43 of the second terminal fitting 41 and the second bolt hole 43 of the second sub-terminal 52 are coaxially arranged and the crimping portion 13 of the second terminal fitting 41 and the crimping portion 13 of the second sub-terminal 52 are arranged laterally adjacent to each other. The second lock fitting portions 45 are arranged to project further leftward than the left end edge of the second plate-like base portion 53. The second lock supporting portions 47 and the second resilient lock pieces 48 are arranged to project further rightward than the right end edge of the second plate-like base portion 53.

(Assembly Procedure of First Terminal Module 10 and Second Terminal Module 40)

The both terminal modules 10, 40 are assembled by stacking the second base plate portion 42 on the upper surface of the first base plate portion 12 while bringing the second terminal fitting 41 closer to the first terminal fitting 11 from right, inserting projecting end parts of the second lock fitting portions 45 between the first lock supporting portions 21 and the first resilient lock pieces 22 and inserting projecting end parts of the first lock fitting portions 19 between the second lock supporting portions 47 and the second resilient lock pieces 48.

From this state, the assembly is proceeded by relatively and parallelly moving the second terminal module 40 leftward with respect to the first terminal module 10. The first protecting portions 28 of the first terminal fitting 11 are arranged on a rear end part of the first base plate portion 12 in the assembly direction with the second terminal fitting 41. Since the first protecting portions 28 are in the form of ribs extending in parallel to the assembly direction, the first protecting portions 28 are not deformed even if being pushed with fingers. Since the second protecting portions 49 are also arranged on a rear end part of the second base plate portion 42 in the assembly direction with the first terminal fitting 11, the second protecting portions 49 are not deformed even if being pushed with fingers.

In the process of assembling the both terminal modules 10, 40, the second resilient lock pieces 48 are resiliently deformed downward due to interference with the first lock portions 20 at the same time as the first resilient lock pieces 22 are resiliently deformed upward due to interference with the second lock portions 46. The pair of first lock fitting portions 19 slide in contact with the pair of second guide surfaces 50 while sandwiching the second guide surfaces 50 from front and behind and the pair of second lock fitting portions 45 slide in contact with the pair of first guide surfaces 29 while sandwiching the first guide surfaces 29 from front and behind, thereby restricting relative displacements of the both terminal modules 10, 40 in the front-rear direction.

When the both terminal modules 10, 40 reach a properly assembled state, the first bolt holes 14 and the second bolt holes 43 are coaxially arranged. The first resilient lock pieces 22 resiliently return and the second lock portions 46 are locked to the slits 27 of the first resilient lock pieces 22. The second resilient lock pieces 48 resiliently return and the first lock portions 20 are locked to the slits 27 of the second resilient lock pieces 48. By these locking actions, the both terminal modules 10, 40 are locked not to be separated in the lateral direction and the assembly of the combination terminal is completed.

With the both terminal modules 10, 40 assembled, the first contact point portions 30 of the first base plate portion 12 are in contact with the second base plate portion 42 and press the second base plate portion 42 and the first resilient lock pieces 22 upward. The first contact point portions 30 and the second base plate portion 42 are connected with a predetermined contact pressure by resilient restoring forces of the first resilient lock pieces 22. The second contact point portions 51 of the second base plate portion 42 are in contact with the first base plate portion 12 and press the first base plate portion 12 and the second resilient lock pieces 48 downward. The second contact point portions 51 and the first base plate portion 12 are connected with a predetermined contact pressure by resilient restoring forces of the second resilient lock pieces 48.

The second lock fitting portions 45 are sandwiched between the first lock supporting portions 21 and the first resilient lock pieces 22. The second lock fitting portion 45 is sandwiched at the base end part 25 of the folded portion 24 where a displacement amount is smallest when the first resilient lock piece 22 is resiliently deformed. The first lock fitting portions 19 are sandwiched between the second lock supporting portions 47 and the second resilient lock pieces 48. The first lock fitting portion 19 is sandwiched at the base end part 25 of the folded portion 24 where a displacement amount is smallest when the second resilient lock piece 48 is resiliently deformed. In this way, the both terminal modules 10, 40 can be reliably prevented from being separated in the vertical direction.

The second lock portion 46 is locked to the first resilient lock piece 22 at the extending end part 26 of the folded portion 24. A resilient deformation amount of the first resilient lock piece 22 during interference with the second lock portion 46 is smaller when the second lock portion 46 interferes with the extending end part 26 of the folded portion 24 than when the second lock portion 46 interferes with the base end part 25 of the folded portion 24. Therefore, resistance generated when the second lock portion 46 interferes with the first resilient lock piece 22 is suppressed to be small. Similarly, since the first lock portion 20 is locked to the second resilient lock piece 48 at the extending end part 26 of the folded portion 24, resistance generated when the first lock portion 20 interferes with the second resilient lock piece 48 is also suppressed to be small.

The combination terminal of this embodiment is provided with the first terminal fitting 11 including the first base plate portion 12 and the second terminal fitting 41 including the second base plate portion 42 to be stacked on the first base plate portion 12. The second terminal fitting 41 is assembled with the first terminal fitting 11 by being displaced in the lateral direction intersecting a stacking direction of the both base plate portions 12, 42.

The first terminal fitting 11 is formed with the resiliently deformable first resilient lock pieces 22. The second terminal fitting 41 is formed with the second lock portions 46 for locking the both terminal fittings 11, 41 in the assembled state by being locked to the first resilient lock pieces 22. The second terminal fitting 41 is formed with the resiliently deformable second resilient lock pieces 48. The first terminal fitting 11 is formed with the first lock portions 20 for locking the both terminal fittings 11, 41 in the assembled state by being locked to the second resilient lock pieces 48. In the process of assembling the both terminal fittings 11, 41, the first resilient lock pieces 22 are resiliently deformed by interfering with the second lock portions 46 and the second resilient lock pieces 48 are resiliently deformed by interfering with the first lock portions 20. Since resistance generated in the process of assembling the both terminal fittings 11, 41 is small as compared to the case where terminal fittings are assembled while a resiliently undeformable projection is strongly rubbed against the mating terminal fitting, manual assembly is possible.

Since the first terminal fitting 11 is integrally formed with the first protecting portions 28 for preventing the interference of an external matter with the first resilient lock pieces 22, there is no possibility that the first resilient lock pieces 22 are separated from the second lock portions 46 due to the interference of the external matter. Since the second terminal fitting 41 is integrally formed with the second protecting portions 49 for preventing the interference of an external matter with the second resilient lock pieces 48, there is no possibility that the second resilient lock pieces 48 are separated from the first lock portions 20 due to the interference of the external matter.

The first protecting portion 28 includes the first guide surface 29 to be brought into sliding contact with the second terminal fitting 41 in the process of assembling the first and second terminal fittings 11, 41. The second protecting portion 49 includes the second guide surface 50 to be brought into sliding contact with the first terminal fitting 11 in the process of assembling the first and second terminal fittings 11, 41. According to this configuration, workability when the first and second terminal fittings 11, 41 are assembled is good. The shape of the first terminal fitting 11 can be simplified as compared to the case where the first guide surfaces 29 are formed on parts different from the first protecting portions 28. The shape of the second terminal fitting 41 can be simplified as compared to the case where the second guide surfaces 50 are formed on parts different from the second protecting portions 49.

The first resilient lock piece 22 has a cantilever shape extending from the first base plate portion 12, and the second lock portion 46 is arranged to lock the extending end part 26 of the first resilient lock piece 22. A resilient deformation amount of the first resilient lock piece 22 when the extending end part 26 of the first resilient lock piece 22 is locked by the second lock portion 46 is smaller than that when the base end part 25 of the first resilient lock piece 22 closer to a deflection fulcrum of the first resilient lock piece is locked by the second lock portion 46. Therefore, assembly resistance due to the resilient deformation of the first resilient lock piece 22 is reduced.

The second resilient lock piece 48 has a cantilever shape extending from the second base plate portion 42, and the first lock portion 20 is arranged to lock the extending end part 26 of the second resilient lock piece 48. A resilient deformation amount of the second resilient lock piece 48 when the extending end part 26 of the second resilient lock piece 48 is locked by the first lock portion 20 is smaller than that when the base end part 25 of the second resilient lock piece 48 closer to a deflection fulcrum of the second resilient lock piece 48 is locked by the first lock portion 20. Therefore, assembly resistance due to the resilient deformation of the second resilient lock piece 48 is reduced.

The first resilient lock pieces 22 are arranged to sandwich the second base plate portion 42 between the first base plate portion 12 and the first resilient lock pieces 22 and have also a function of preventing the separation of the both terminal fittings 11, 41. The shape of the first terminal fitting 11 can be simplified as compared to the case where a dedicated part for preventing the separation of the both terminal fittings 11, 41 is formed separately from the first resilient lock pieces 22. The second resilient lock pieces 48 are arranged to sandwich the first base plate portion 12 between the second base plate portion 42 and the second resilient lock pieces 48 and have also the function of preventing the separation of the both terminal fittings 11, 41. The shape of the second terminal fitting 41 can be simplified as compared to the case where a dedicated part for preventing the separation of the both terminal fittings 11, 41 is formed separately from the second resilient lock pieces 48.

The first resilient lock piece 22 includes the bent portion 23 folded and extending from the first base plate portion 12 and the folded portion 24 cantilevered parallel to the first base plate portion 12 from the bent portion 23. A displacement amount of the base end part 25 of the folded portion 24 is smaller than that of the extending end part 26 of the folded portion 24 when the first resilient lock piece 22 is resiliently deformed. Since the second lock fitting portion 45 of the second base plate portion 42 is arranged to overlap on the base end part 25 connected to the bent portion 23, out of the folded portion 24, the separation of the both terminal fittings 11, 41 can be reliably prevented. The second resilient lock piece 48 includes the bent portion 23 folded and extending from the second base plate portion 42 and the folded portion 24 cantilevered parallel to the second base plate portion 42 from the bent portion 23. A displacement amount of the base end part 25 of the folded portion 24 is smaller than that of the extending end part 26 of the folded portion 24 when the second resilient lock piece 48 is resiliently deformed. Since the first lock fitting portion 19 of the first base plate portion 12 is arranged to overlap on the base end part 25 connected to the bent portion 23, out of the folded portion 24, the separation of the both terminal fittings 11, 41 can be reliably prevented.

A most easily deformed part of the first resilient lock piece 22 during interference with an external matter is the extending end part 26 of the folded portion 24. Since the first protecting portion 28 is arranged side by side with the extending end part 26 of the folded portion 24, the first protecting portion 28 has a high effect of suppressing the deformation of the first resilient lock piece 22. A most easily deformed part of the second resilient lock piece 48 during interference with an external matter is the extending end part 26 of the folded portion 24. Since the second protecting portion 49 is arranged side by side with the extending end part 26 of the folded portion 24, the second protecting portion 49 has a high effect of suppressing the deformation of the second resilient lock piece 48.

The first protecting portion 28 is in the form of a rib arranged on the rear end part of the first terminal fitting 11 in the assembly direction with the second terminal fitting 41 and extending in parallel to the assembly direction of the both terminal fittings 11, 41. The second protecting portion 49 is in the form of a rib arranged on the rear end part of the second terminal fitting 41 in the assembly direction with the first terminal fitting 11 and extending in parallel to the assembly direction of the both terminal fittings 11, 41. When the both terminal fittings 11, 41 are assembled, fingers can be placed on the first and second protecting portions 28, 49 to push the both terminal fittings 11, 41 in the assembly direction. Since the first and second protecting portions 28, 49 are in the form of ribs parallel to the assembly direction of the both terminal fittings 11, 41, there is no possibility that the first and second protecting portions 28, 49 are deformed even if being pushed with fingers during assembly. Since at least the bent portions 23 of the first and second resilient lock pieces 22, 48 are formed with the slits 27 along the extending directions of the first and second resilient lock pieces 22, 48, cross-sectional areas of the bent portions 23 are small. In this way, processability is good when the first resilient lock piece 22 is formed by bending and when the second resilient lock piece 48 is formed by bending.

OTHER EMBODIMENTS

The present invention is not limited to the above described and illustrated embodiment, but is represented by claims. The present invention is intended to include all changes in the scope of claims and in the meaning and scope of equivalents and also include the following embodiments.

Although the resilient lock piece has the function of preventing the separation of the first and second terminal fittings in the above embodiment, the resilient lock piece may not have the function of preventing the separation of the first and second terminal fittings.

Although the protecting portion is formed with the guide surface in the above embodiment, the protecting portion may not have the guide surface.

Although both the first and second terminal fittings are formed with the resilient lock pieces and the lock portions in the above embodiment, only the first terminal fitting may be formed with the resilient lock pieces and only the second terminal fitting may be formed with the lock portions.

Although the first and second terminal fittings are assembled by being linearly and parallelly moved in the above embodiment, the first and second terminal fittings may be assembled by being rotated.

Although the protecting portion is in the form of a rib extending in parallel to the assembly direction of the first and second terminal fittings in the above embodiment, the protecting portion may be in the form of a rib extending in a direction intersecting the assembly direction of the both terminal fittings.

Although the resilient lock piece is cantilevered in the direction intersecting the assembly direction of the first and second terminal fittings in the above embodiment, the resilient lock piece may be cantilevered in a direction parallel to the assembly direction of the both terminal fittings.

Although the lock portion is in the form of a projection and locked to the slit of the resilient lock piece in the above embodiment, the lock portion may be in the form of a hole and a projection of the resilient lock piece may be locked to the lock portion.

Although the first terminal fitting is assembled with the second terminal fitting with the first sub-terminal assembled with the first terminal fitting in advance, the first terminal fitting may be singly assembled with the second terminal fitting.

Although the second terminal fitting is assembled with the first terminal fitting with the second sub-terminal assembled with the second terminal fitting in advance, the second terminal fitting may be singly assembled with the first terminal fitting.

Although the first and second terminal fittings are assembled while linearly and parallelly moving in the above embodiment, the first and second terminal fittings may be assembled while being rotated.

LIST OF REFERENCE NUMERALS

10 . . . first terminal module
11 . . . first terminal fitting
12 . . . first base plate portion
13 . . . crimping portion
14 . . . first bolt hole
15 . . . first receiving portion
16 . . . retaining hole
17 . . . retaining projection
18 . . . cut portion
19 . . . first lock fitting portion
20 . . . first lock portion
21 . . . first lock supporting portion
22 . . . first resilient lock piece
23 . . . bent portion
24 . . . folded portion
25 . . . base end part
26 . . . extending end part
27 . . . slit
28 . . . first protecting portion
29 . . . first guide surface
30 . . . first contact point portion
32 . . . first sub-terminal
33 . . . first plate-like base portion
34 . . . rotation stop portion
35 . . . first covering portion
40 . . . second terminal module
41 . . . second terminal fitting
42 . . . second base plate portion
43 . . . second bolt hole
44 . . . second covering portion
45 . . . second lock fitting portion
46 . . . second lock portion
47 . . . second lock supporting portion
48 . . . second resilient lock piece
49 . . . second protecting portion
50 . . . second guide surface
51 . . . second contact point portion
52 . . . second sub-terminal
53 . . . second plate-like base portion
54 . . . second receiving portion

What is claimed is:

1. A combination terminal, comprising:

a first terminal fitting including a first base plate portion; and a second terminal fitting including a second base plate portion to be stacked on the first base plate portion, the second terminal fitting being assembled with the first terminal fitting by being displaced in a direction intersecting a stacking direction, the first terminal fitting being formed with a resiliently deformable resilient lock piece, the second terminal fitting being formed with a lock portion for locking the first and second terminal fittings in an assembled state by being locked to the resilient lock piece, and the first terminal fitting being integrally formed with a protecting portion for preventing interference of an external matter with the resilient lock piece, wherein the resilient lock piece has a cantilever shape extending from the first base plate portion, and the lock portion is arranged to lock an extending end part of the resilient lock piece.

2. The combination terminal of claim 1, wherein the protecting portion has a guide surface to be brought into sliding contact with the second terminal fitting in the process of assembling the first and second terminal fittings.

3. The combination terminal of claim 1, wherein the resilient lock piece is arranged to sandwich the second base plate portion between the first base plate portion and the resilient lock piece.

4. The combination terminal of claim 3, wherein:

the resilient lock piece includes a bent portion folded and extending from the first base plate portion and a folded portion cantilevered parallel to the first base plate portion from the bent portion, and the second base plate portion is arranged to overlap on a base end part connected to the bent portion, out of the folded portion.

5. The combination terminal of claim 1, wherein:

the resilient lock piece includes a bent portion folded and extending from the first base plate portion and a folded portion cantilevered parallel to the first base plate portion from the bent portion, and the protecting portion is arranged side by side with an extending end part of the folded portion.

6. The combination terminal of claim 1, wherein the protecting portion is in the form of a rib arranged on a rear end part of the first terminal fitting in an assembly direction with the second terminal fitting and extending in parallel to the assembly direction.

7. The combination terminal of claim 1, wherein:

the resilient lock piece includes a bent portion folded and extending from the first base plate portion and a folded portion cantilevered parallel to the first base plate portion from the bent portion, and at least the bent portion of the resilient lock piece is formed with a slit along an extending direction of the resilient lock piece.

8. The combination terminal of claim 7, wherein the lock portion is locked to the slit.

9. A combination terminal, comprising:

a first terminal fitting including a first base plate portion; and a second terminal fitting including a second base plate portion to be stacked on the first base plate portion, the second terminal fitting being assembled with the first terminal fitting by being displaced in a direction intersecting a stacking direction, the first terminal fitting being formed with a resiliently deformable resilient lock piece, the second terminal fitting being formed with a lock portion for locking the first and second terminal fittings in an assembled state by being locked to the resilient lock piece, and the first terminal fitting being integrally formed with a protecting portion for preventing interference of an external matter with the resilient lock piece, wherein the resilient lock piece is arranged to sandwich the second base plate portion between the first base plate portion and the resilient lock piece.

10. A combination terminal, comprising:

a first terminal fitting including a first base plate portion; and a second terminal fitting including a second base plate portion to be stacked on the first base plate portion, the second terminal fitting being assembled with the first terminal fitting by being displaced in a direction intersecting a stacking direction, the first terminal fitting being formed with a resiliently deformable resilient lock piece, the second terminal fitting being formed with a lock portion for locking the first and second terminal fittings in an assembled state by being locked to the resilient lock piece, and the first terminal fitting being integrally formed with a protecting portion for preventing interference of an external matter with the resilient lock piece, wherein the resilient lock piece includes a bent portion folded and extending from the first base plate portion and a folded portion cantilevered parallel to the first base plate portion from the bent portion, and at least the bent portion of the resilient lock piece is formed with a slit along an extending direction of the resilient lock piece.

* * * * *